United States Patent
Chen et al.

(10) Patent No.: US 8,824,525 B2
(45) Date of Patent: Sep. 2, 2014

(54) MULTIPATH SEARCHING METHOD AND MULTIPATH SEARCHER

(71) Applicant: Huawei Technologies Co., Ltd., Guangdong (CN)

(72) Inventors: Zhiqun Chen, Shanghai (CN); Gengshi Wu, Shanghai (CN); Feng Li, Shanghai (CN); Xiuqin Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/714,099

(22) Filed: Dec. 13, 2012

(65) Prior Publication Data

US 2013/0188668 A1    Jul. 25, 2013

(30) Foreign Application Priority Data

Dec. 16, 2011 (CN) .......................... 2011 1 0422765

(51) Int. Cl.
| | |
|---|---|
| *H04B 1/00* | (2006.01) |
| *H04L 25/02* | (2006.01) |
| *H04B 1/7115* | (2011.01) |
| *H04B 1/7113* | (2011.01) |

(52) U.S. Cl.
CPC .............. *H04L 25/02* (2013.01); *H04B 1/7115* (2013.01); *H04L 25/0212* (2013.01); *H04B 1/7113* (2013.01)
USPC .......................... 375/147; 375/142; 455/192.1

(58) Field of Classification Search
CPC ....... H04B 1/707; H04B 1/7117; H04L 45/00
See application file for complete search history.

(56) References Cited

U.S. PATENT DOCUMENTS

| | | | |
|---|---|---|---|
| 7,352,704 B1 | 4/2008 | Toussi et al. | |
| 2010/0035568 A1* | 2/2010 | Ghosh | ........................ 455/192.1 |

FOREIGN PATENT DOCUMENTS

| | | |
|---|---|---|
| CN | 101098187 A | 1/2008 |
| CN | 101123462 A | 2/2008 |

OTHER PUBLICATIONS

Search Report dated Jun. 4, 2013 in connection with Chinese Patent Application No. 2011104227650.
"Design and Implementation of an Efficient Multipath Searcher for RAKE Receiver", Journal of Fudan University (Natural Science), vol. 49, No. 6, Dec. 2010, 7 pages.
Elena Simona Lohan, et al., "Highly Efficient Techniques for Mitigating the Effects of Multipath Propagation in DS-CDMA Delay Estimation", IEEE Transactions on Wireless Communications, vol. 4, No. 1, Jan. 2005, p. 149-162.

* cited by examiner

*Primary Examiner* — Leon-Viet Nguyen

(57) ABSTRACT

Embodiments of the present invention provide a multipath searching method and a multipath searcher, to improve accuracy of delay estimation, thereby improving performance of a receiver. The method includes: performing processing on received signals $r_i(t)$ and pilot sequences $p_i(t)$ to obtain upsampling signals $y(\tau)$; subtracting contribution values of a current multipath waveform to other multipath waveforms by using a raised cosine function with a peak position set to zero and according to a global maximum value of $|y(\tau)|^2$ and a total of M sampling points $\hat{\tau}_1^{(m)}$ near the global maximum value, to obtain an upsampling signal $y_L(\tau)$ having a minimum residual in M groups of upsampling signals $y_L^{(m)}(\tau)$; and obtaining a time delay power spectrum of the upsampling signal $y_L(\tau)$ having the minimum residual.

10 Claims, 4 Drawing Sheets

MULTIPATH SEARCHING METHOD AND MULTIPATH SEARCHER

CROSS-REFERENCE TO RELATED APPLICATIONS

This application claims priority to Chinese Patent Application No. 201110422765.0, filed on Dec. 16, 2011, which is hereby incorporated by reference in its entirety.

FIELD OF THE INVENTION

The present invention relates to the field of communications, and in particular, to a multipath searching method and a multipath searcher.

BACKGROUND OF THE INVENTION

A multipath searcher is an important module of an RAKE receiver in a wideband code division multiple access (Wideband Code Division Multiple Access, WCDMA) system, and its performance directly influences performance and implementation complexity of the RAKE receiver. A function of multipath searching (or time delay estimation) is to obtain signal energy distribution characteristics at different time delay points through a matching filter, identify multipath positions having greater energy, and distribute their time amounts to different receiving paths of the RAKE receiver. The multipath searching provides information such as a multipath position and multipath strength of a wireless channel for subsequent synchronization, channel estimation, Rake reception, channel equalization, measurement, and so on.

An existing multipath searching method includes calculating steps in the following order: performing correlation and coherent accumulation on received signals and reference sequences; then performing time delay estimation; performing incoherent accumulation after a value obtained through the time delay estimation is converted into an absolute value and squared; and finally, selecting a maximum value and outputting a final time delay estimation result, where the time delay estimation specifically is:

1. Calculate correlation values of the received signals and reference signals to find a position of a global maximum value.
2. Take M discrete values in a range near the global maximum value, and perform serial estimation on each of the taken values, that is, first l−1 maximum values are multiplied by a raised cosine (Raised Cosine, RC) waveform, and subtracted from an original correlated waveform, then an $l^{th}$ maximum value is found, and finally L maximum value positions in each group of M groups are obtained.
3. Calculate a sum of L reconstructed waveforms, compare mean-square errors between the original waveform and the reconstructed waveforms, and select maximum value positions of the group with a minimum mean-square error as an estimated output of a multipath delay.

When multipath waveforms are reconstructed, that is, when a value of the original waveform is multiplied by an RC waveform, an ideal multipath waveform is a multiplied product of a gain of the path and the RC waveform. However, in the foregoing multipath searching method provided in the prior art, when multipath waveforms are reconstructed, a used value of the original waveform is a result of superimposing all multipath waveforms, and because influences of other multipath waveforms are included when the multipath waveforms are reconstructed, a result finally obtained has low accuracy, resulting in that multipaths with an interval less than one chip cannot be distinguished, and weak multipaths are difficult to be detected.

SUMMARY OF THE INVENTION

Embodiments of the present invention provide a multipath searching method and a multipath searcher, to improve accuracy of delay estimation, thereby improving performance of a receiver.

An embodiment of the present invention provides a multipath searching method, where the method includes: performing processing on received signals $r_i(t)$ and pilot sequences $p_i(t)$ to obtain upsampling signals $y(\tau)$;

subtracting contribution values of a current multipath waveform to other multipath waveforms by using a raised cosine function with a peak position set to zero and according to a global maximum value of $|y(\tau)|^2$ and a total of M sampling points $\hat{\tau}_1^{(m)}$ near the global maximum value, to obtain an upsampling signal $y_L(\tau)$ having a minimum residual in M groups of upsampling signals $y_L^{(m)}(\tau)$, where M is an integer greater than or equal to 1, and $|y(\tau)|^2$ is a squared absolute value of $y(\tau)$; and obtaining a time delay power spectrum of the upsampling signal $y_L(\tau)$ having the minimum residual.

An embodiment of the present invention provides a multipath searcher, where the apparatus includes: a pre-processing module, configured to perform processing on received signals $r_i(t)$ and pilot sequences $p_i(t)$ to obtain upsampling signals $y(\tau)$;

a minimum residual obtaining module, configured to subtract contribution values of a current multipath waveform to other multipath waveforms by using a raised cosine function with a peak position set to zero and according to a global maximum value of $|y(\tau)|^2$ and M sampling points $\hat{\tau}_1^{(m)}$ near the global maximum value, to obtain an upsampling signal $y_L(\tau)$ having a minimum residual in M groups of upsampling signals $y_L^{(m)}(\tau)$, where M is an integer greater than or equal to 1, and $|y(\tau)|^2$ is a squared absolute value of $y(\tau)$; and a time delay power spectrum obtaining module, configured to obtain a time delay power spectrum of the upsampling signal $y_L(\tau)$ having the minimum residual.

It may be known from the foregoing embodiments of the present invention that, the contribution values of the current multipath waveform to the other multipath waveforms may be subtracted by using the raised cosine function with the peak position set to zero and according to the global maximum value of the squared absolute value $|y(\tau)|^2$ of the upsampling signal $y(\tau)$ and the M sampling points $\hat{\tau}_1^{(m)}$ near the global maximum value, to obtain the upsampling signal $y_L(\tau)$ having the minimum residual in the M groups of upsampling signals $y_L^{(m)}(\tau)$, and further obtain the time delay power spectrum of the upsampling signal $y_L(\tau)$ having the minimum residual. Therefore, compared with the prior art, in the method provided by the embodiments of the present invention, when multipath waveforms are reconstructed, an influence of the current multipath waveform on other multipaths is eliminated, so that multipaths with an interval less than one chip may be better distinguished, and weak multipaths may also be better detected, thereby improving the performance of the receiver.

BRIEF DESCRIPTION OF THE DRAWINGS

To illustrate the technical solutions in the embodiments of the present invention more clearly, accompanying drawings required for describing the prior art or the embodiments are the briefly introduced in the following. Apparently, the accompanying drawings in the following description are merely some embodiments of the present invention, and persons of skill in the art may further obtain other drawings from these accompanying drawings.

DETAILED DESCRIPTION OF THE EMBODIMENTS

The technical solutions in the embodiments of the present invention are described clearly and completely in the following with reference to the accompanying drawings in the embodiments of the present invention. Apparently, the embodiments to be described are merely part rather than all of the embodiments of the present invention. Based on the embodiments of the present invention, all other embodiments obtained by persons skilled in the art shall fall within the protection scope of the present invention.

Figure 1:
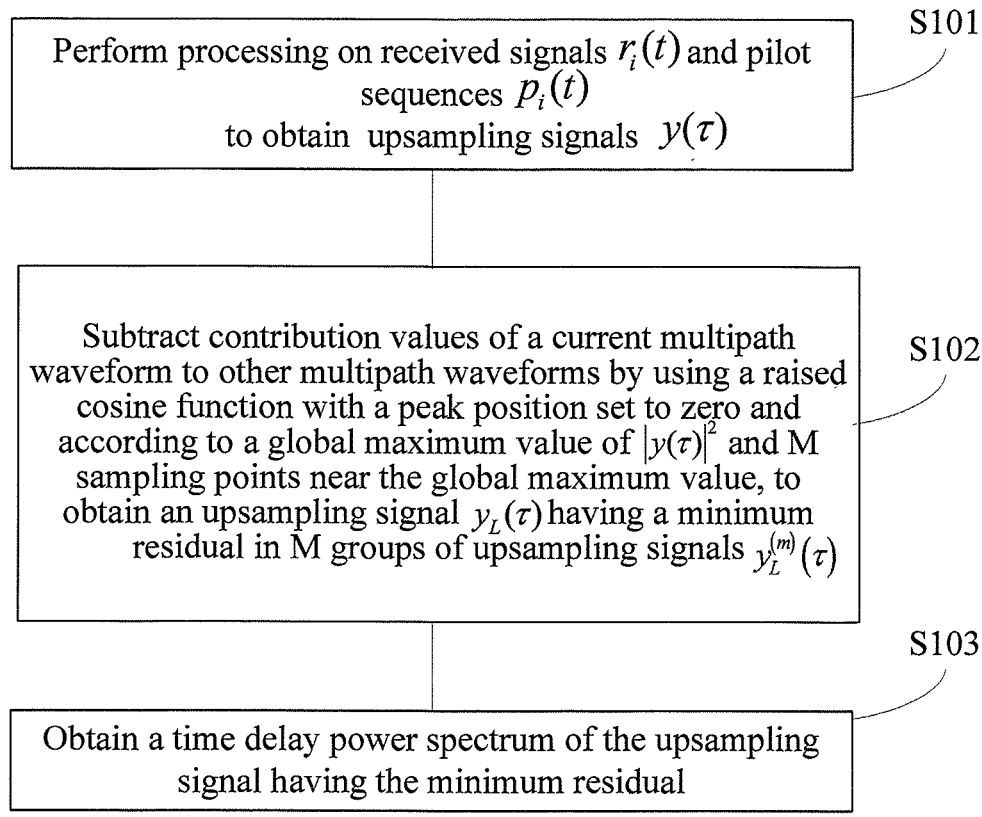
FIG. 1 is a schematic flow chart of a multipath searching method according to an embodiment of the present invention.

FIG. 1 is a schematic flow chart of a multipath searching method according to an embodiment of the present invention, which mainly includes the following steps:

S101: Perform processing on received signals $r_i(t)$ and pilot sequences $p_i(t)$ to obtain upsampling signals $y(\tau)$.

In the embodiment of the present invention, first, a correlator may be used to perform a correlation operation on N received signals $r_i(t)$ and pilot sequences $p_i(t)$, where the correlation operation is $$\sum_{t=0}^{N-1} r_i(t+\tau)$$

$p_i^*(t)$ and $p_i^*(t)$ is a complex conjugate of the pilot sequences $p_i(t)$. Then, coherent accumulation is performed on a result of the correlation operation $$\sum_{t=0}^{N-1} r_i(t+\tau) p_i^*(t)$$

$p_i^*(t)$ on I pilot symbols to obtain $$y_c(\tau) = \sum_{i=0}^{I-1} y_i(\tau),$$

where I is a positive integer; and a coherent accumulator may be used to perform an operation of the coherent accumulation.

Next, upsampling (upsampling), for example, K-multiple) upsampling is performed on $$\sum_{i=0}^{I-1} y_i(\tau)$$

obtained through the coherent accumulation, that is, K−1 zero values are inserted between every two sampling points. Afterward, filtering is performed on upsampled values obtained through the K-multiple upsampling to obtain $y(\tau)$. In the embodiment of the present invention, an interpolation filter may be used to perform filtering on the upsampled values.

S102: Subtract contribution values of a current multipath waveform to other multipath waveforms by using a raised cosine function with a peak position set to zero and according to a global maximum value of $|y(\tau)|^2$ and a total of M sampling points $\hat{\tau}_1^{(m)}$ near the global maximum value, to obtain an upsampling signal $y_L(\tau)$ having a minimum residual in M groups of upsampling signals $y_L^{(m)}(\tau)$, where M is an integer greater than or equal to 1, and $|y(\tau)|^2$ is a squared absolute value of $y(\tau)$.

$|y(\tau)|^2$ is the squared absolute value of $y(\tau)$ obtained after the upsampling and the filtering are performed on $$\sum_{i=0}^{I-1} y_i(\tau)$$

in step S101. If a value of $|y(\tau)|^2$ is obtained, it is not difficult to obtain the global maximum value of $|y(\tau)|^2$, thereby acquiring a position of the global maximum value of $|y(\tau)|^2$. In the embodiment of the present invention, the position of the global maximum value of $|y(\tau)|^2$ is represented by $\hat{\tau}_g$.

Although the global maximum value of $|y(\tau)|^2$ and its position can be found through the foregoing method, taking influences of other multipath waveforms into consideration, the foregoing maximum value and its position are not very accurate. Therefore, in the embodiment of the present invention, M sampling points $\hat{\tau}_1^{(m)}$ are taken at and near the position $\hat{\tau}_g$ which is of the global maximum value of $|y(\tau)|^2$ and found in advance, M groups of $y_L^{(m)}(\tau)$ are obtained through an iteration operation and residuals are calculated, and then the M residuals are compared to obtain the upsampling signal $y_L(\tau)$ having the minimum residual in the M groups of $y_L^{(m)}(\tau)$. Specifically, the iteration operation is as follows:

S1021: Take M sampling points in $[\hat{\tau}_g - \Delta\tau, \hat{\tau}_g + \Delta\tau]$.

S1022: Perform the iteration operation on each sampling point $\hat{\tau}_1^{(m)}$ of the M sampling points according to iteration formulas $y_l^{(m)}(\tau) = y_{l-1}^{(m)}(\tau) - y_{l-1}^{(m)}(\hat{\tau}_{l-1}^{(m)}) R(\tau - \hat{\tau}_{l-1}^{(m)})$ and $$\hat{\tau}_l^{(m)} = \arg\max_\tau |y_l^{(m)}(\tau)|^2,$$

where l takes a value of 2, 3, ..., L, m takes a value of 1, 2, 3, ..., M, and L and M may take empirical values of 3 and 8 respectively.

For each sampling point $\hat{\tau}_1^{(m)}$, one group $y_l^{(m)}(\tau)$ may be obtained through one iteration. According to a value of l, L $y_l^{(m)}(\tau)$ may be obtained through one iteration for each sampling point $\hat{\tau}_1^{(m)}$. In this way, when iterations for all the sampling points are finished, it is equivalent to performing M×L iterations, and taking a last iteration result $y_L^{(m)}(\tau)$ of each group of the M groups.

S1023: Calculate a residual for the last iteration result $y_L^{(m)}(\tau)$ of each group according to a formula $$e^{(m)} = \sum_{\tau, \tau \neq \hat{\tau}_l^{(m)}} |y_L^{(m)}(\tau)|^2.$$

Finally, residuals in all the groups are compared to obtain the upsampling signal $y_L(\tau)$ having the minimum residual in the M groups of $y_L^{(m)}(\tau)$.

It should be noted that, in the embodiment of the present invention, $R(\tau)$ in $y_l^{(m)}(\tau) = y_{l-1}^{(m)}(\tau) - y_{l-1}^{(m)}(\hat{\tau}_{l-1}^{(m)}) R(\tau - \hat{\tau}_{l-1}^{(m)})$ is a standard raised cosine function (Raised Cosine, RC) with a peak position set to zero, that is, $$R(\tau) = \begin{cases} 0, & \tau = 0 \\ \dfrac{\sin\left(\dfrac{\pi\tau}{T}\right)\cos\left(\dfrac{\beta\pi\tau}{T}\right)}{\dfrac{\pi\tau}{T}\left(1-\left(\dfrac{2\beta\tau}{T}\right)^2\right)}, & \tau \neq 0, \end{cases}$$

where sin(.) and cos(.) represent sine and cosine functions respectively, $\beta$ represents a rolloff factor, and T represents a symbol interval. Taking a WCDMA system as an example, $\beta = 0.22$, and $$T = \frac{1}{3.84e6}s$$

(second).

S103: Obtain a time delay power spectrum of the upsampling signal $y_L(\tau)$ having the minimum residual.

In the embodiment of the present invention, the time delay power spectrum of the upsampling signal $y_L(\tau)$ having the minimum residual may be obtained. Specifically, incoherent accumulation is performed on $z_j(\tau) = |y_L^{(\tau)}|^2$ on J time slots according to $$z(\tau) = \sum_{j=0}^{J-1} z_j(\tau),$$

where J is an integer greater than or equal to 1. Filtering is performed on $z(\tau)$, for example, $\alpha$ filtering is performed according to $v_n(\tau) = \alpha v_{n-1}(\tau) + (1-\alpha)z(\tau)$ to obtain the time delay power spectrum $v_n(\tau)$, where $\alpha$ has a value range of $0 < \alpha < 1$. According to common sense, a maximum value of the time delay power spectrum $v_n(\tau)$ may be found on the time delay power spectrum $v_n(\tau)$, thereby obtaining a position of the maximum value of the time delay power spectrum $v_n(\tau)$.

It may be known from the foregoing multipath searching method provided by the embodiment of the present invention that, the contribution values of the current multipath waveform to the other multipath waveforms may be subtracted by using the raised cosine function with the peak position set to zero and according to the global maximum value of the squared absolute value $|y(\tau)|^2$ of the upsampling signal $y(\tau)$ and the total of M sampling points $\hat{\tau}_1^{(m)}$ near the global maximum value, to obtain the M groups of upsampling signals $y_L^{(m)}(\tau)$ and compare their residuals, and further obtain the time delay power spectrum of the upsampling signal $y(\tau)$ having the minimum residual. Therefore, compared with the prior art, in the method provided by the embodiment of the present invention, when multipath waveforms are reconstructed, an influence of the current multipath waveform on other multipaths is eliminated, so that multipaths with an interval less than one chip may be better distinguished, and weak multipaths may also be better detected, thereby improving performance of a receiver.

Figure 2:
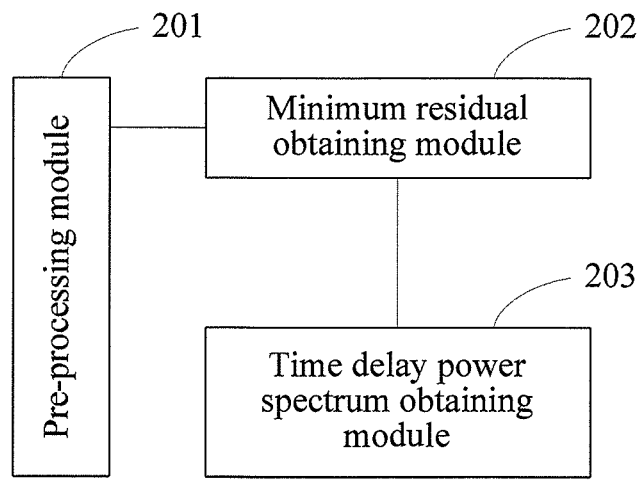
FIG. 2 is a schematic structural diagram of a multipath searcher according to an embodiment of the present invention.

FIG. 2 is a schematic structural diagram of a multipath searcher according to an embodiment of the present invention. For convenience of illustration, only parts related to the embodiment of the present invention are shown. The multipath searcher shown in FIG. 2 may be a receiver configured for WCDMA, for example, an RAKE receiver. The multipath searcher shown in FIG. 2 includes a pre-processing module 201, a minimum residual obtaining module 202, and a time delay power spectrum obtaining module 203, where:

the pre-processing module 201 is configured to perform processing on received signals $r_i(t)$ and pilot sequences $p_i(t)$ to obtain upsampling signals $y(\tau)$;

the minimum residual obtaining module 202 is configured to subtract contribution values of a current multipath waveform to other multipath waveforms by using a raised cosine function with a peak position set to zero and according to a global maximum value of $|y(\tau)|^2$ and M sampling points $\hat{\tau}_1^{(m)}$ near the global maximum value, to obtain an upsampling signal $y_L(\tau)$ having a minimum residual in M groups of upsampling signals $y_L^{(m)}(\tau)$, where M is an integer greater than or equal to 1, and $|y(\tau)|^2$ is a squared absolute value of $y(\tau)$; and the time delay power spectrum obtaining module 203 is configured to obtain a time delay power spectrum of the upsampling signal $y_L(\tau)$ having the minimum residual.

It should be noted that, in the foregoing implementation manner of the multipath searcher, dividing of each functional module is merely for exemplary illustration, and the foregoing functions may be assigned to different functional modules for implementation according to needs in practical applications, for example, configuration requirements of corresponding hardware or consideration of convenience of software implementation, that is, an internal structure of the multipath searcher may be divided into different functional modules to implement all or part of the functions described above. Moreover, in practical applications, corresponding functional modules in this embodiment may be implemented through corresponding hardware, and may also be accomplished through corresponding software executed by corresponding hardware. For example, the pre-processing module may be hardware having a function of executing the performing processing on received signals $r_i(t)$ and pilot sequences $p_i(t)$ to obtain upsampling signals $y(\tau)$, such as a preprocessor, and may also be a general processor or another hardware device capable of executing corresponding computer programs to accomplish the foregoing function. For another example, the minimum residual obtaining module may be hardware having a function of executing the subtracting contribution values of a current multipath waveform from the other multipath waveforms by using a raised cosine function with a peak position set to zero and according to a global maximum value of $a|y(\tau)|^2$ and M sampling points $\hat{\tau}_1^{(m)}$ near the global maximum value, to obtain an upsampling signal $y_L(\tau)$ having a minimum residual in M groups of upsampling signals $y_L^{(m)}(\tau)$, such as a minimum residual obtaining device, and may also be a general processor or another hardware device capable of executing corresponding computer programs to accomplish the foregoing function (the principle described above is applicable to all the embodiments provided by this specification).

Figure 3:
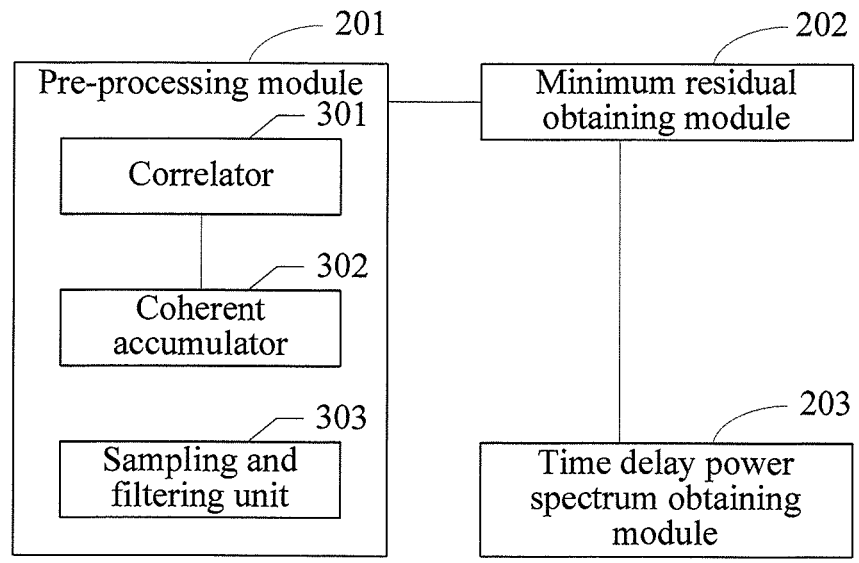
FIG. 3 is a schematic structural diagram of a multipath searcher according to another embodiment of the present invention.

The pre-processing module 201 shown in FIG. 2 may include a correlator 301, a coherent accumulator 302, and a sampling and filtering unit 303, as in a multipath searcher provided by another embodiment of the present invention shown in FIG. 3, where:

the correlator 301 is configured to perform correlation on the received signals $r_i(t)$ and the pilot sequences $p_i(t)$, to obtain $$y_i(\tau) = \sum_{t=0}^{N-1} r_i(t+\tau) p_i^*(t),$$

$p_i^*(t)$, where $p_i^*(t)$ represents a complex conjugate of the pilot sequences $p_i(t)$;

the coherent accumulator 302 is configured to perform coherent accumulation on $y_i(\tau)$ on I pilot symbols to obtain $$y_c(\tau) = \sum_{i=0}^{I-1} y_i(\tau),$$

where I is a positive integer; and the sampling and filtering unit 303 is configured to perform upsampling and filtering on $y_c(\tau)$ to obtain $y(\tau)$.

Figure 4:
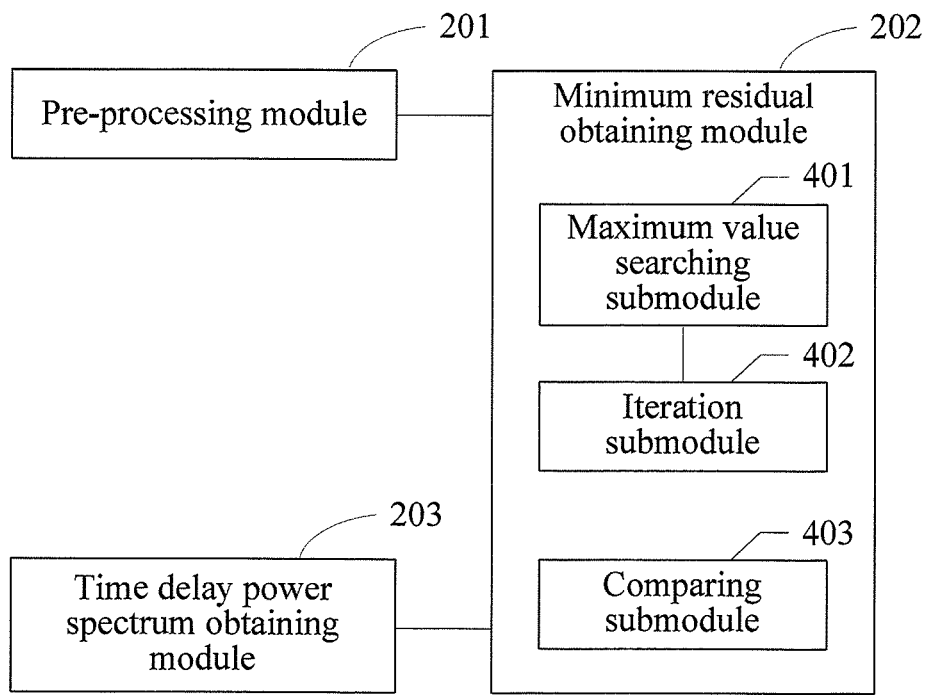
FIG. 4 is a schematic structural diagram of a multipath searcher according to another embodiment of the present invention.

The minimum residual obtaining module 202 shown in FIG. 2 may include a maximum value searching submodule 401, an iteration submodule 402 and a comparing submodule 403, as in a multipath searcher provided by another embodiment of the present invention shown in FIG. 4, where:

the maximum value searching submodule 401 is configured to search $|y(\tau)|^2$ for a position $\hat{\tau}_g$ of the global maximum value of $|y(\tau)|^2$;

the iteration submodule 402 is configured to take a total of M sampling points $\hat{\tau}_1^{(m)}$ at the position $\hat{\tau}_g$ and near the position $\hat{\tau}_g$, obtain the M groups of upsampling signals $y_L^{(m)}(\tau)$ through an iteration operation, and calculate residuals of the M groups of $y_L^{(m)}(\tau)$; and the comparing submodule 403 is configured to compare the M residuals, to obtain the upsampling signal $y_L(\tau)$ having the minimum residual in the M groups of $y_L^{(m)}(\tau)$.

Figure 5:
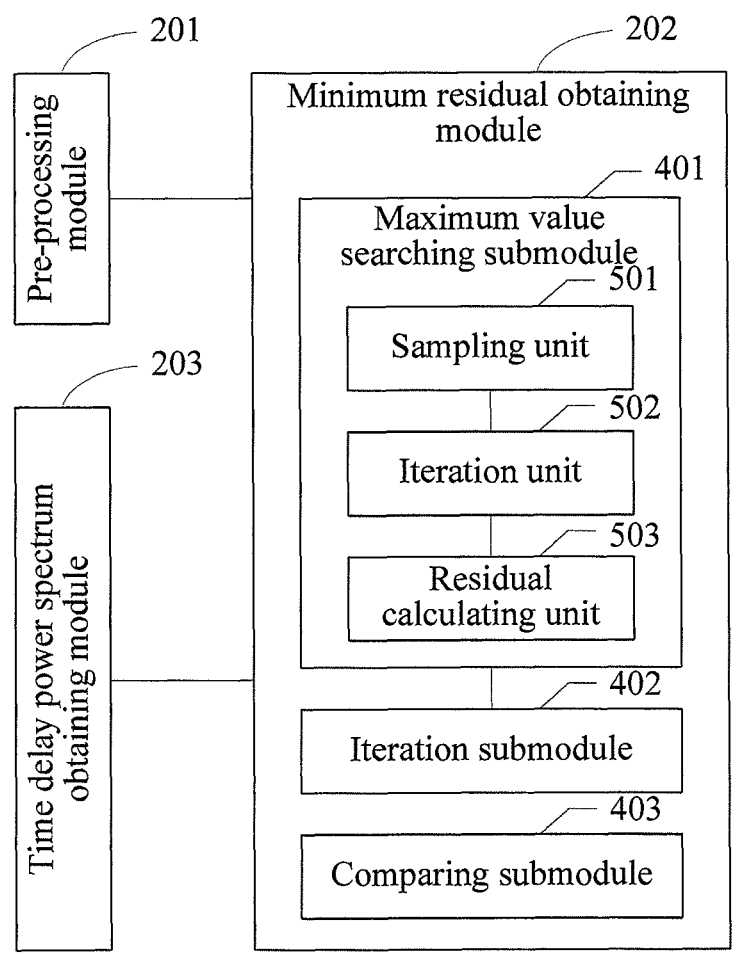
FIG. 5 is a schematic structural diagram of a multipath searcher according to another embodiment of the present invention.

The iteration submodule 402 shown in FIG. 4 may include a sampling unit 501, an iteration unit 502 and a residual calculating unit 503, as in a multipath searcher provided by another embodiment of the present invention shown in FIG. 5, where:

the sampling unit 501 is configured to take M sampling points in $[\hat{\tau}_g - \Delta\tau, \hat{\tau}_g + \Delta\tau]$;

the iteration unit 502 is configured to perform an iteration operation on each sampling point $\hat{\tau}_l^{(m)}$ of the M sampling points according to formulas and $y_l^{(m)}(\tau) = y_{l-1}^{(m)}(\tau) - y_{l-1}^{(m)}(\hat{\tau}_{l-1}^{(m)}) R(\tau - \hat{\tau}_{l-1}^{(m)})$ and $$\hat{\tau}_l^{(m)} = \arg\max_\tau |y_l^{(m)}(\tau)|^2,$$

to obtain the M groups of upsampling signals $y_L^{(m)}(\tau)$, where $R(\tau)$ represents a raised cosine wave function with a peak position set to zero, l takes a value of 2, 3, ..., L, and m takes a value of 1, 2, 3, ..., M; and the residual calculating unit 503 is configured to calculate a residual for each group of upsampling signals $y_L^{(m)}(\tau)$ according to a formula $$e^{(m)} = \sum_{\tau, \tau \neq \hat{\tau}_l^{(m)}} |y_L^{(m)}(\tau)|^2.$$

Figure 6:
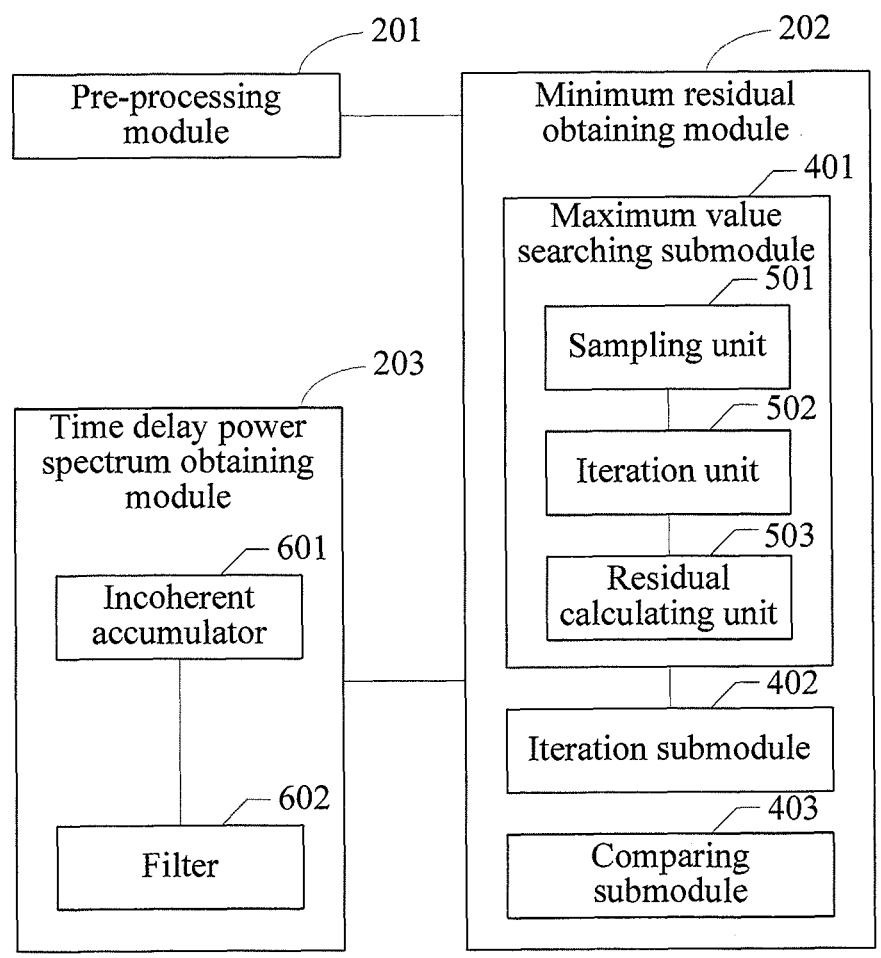
FIG. 6 is a schematic structural diagram of a multipath searcher according to another embodiment of the present invention.

The time delay power spectrum obtaining module 203 shown in FIG. 5 may include an incoherent accumulator 601 and a filter 602, as in a multipath searcher provided by another embodiment of the present invention shown in FIG. 6, where:

the incoherent accumulator 601 is configured to perform incoherent accumulation on $z_j(\tau) = |y_L(\tau)|^2$ on J time slots according to $$z(\tau) = \sum_{j=0}^{J-1} z_j(\tau),$$

where J is an integer greater than or equal to 1; and the filter 602 is configured to perform filtering on $z(\tau)$ according to $v_n(\tau) = \alpha v_{n-1}(\tau) + (1-\alpha) z(\tau)$ to obtain a time delay power spectrum $v_n(\tau)$, where $\alpha$ has a value range of $0 < \alpha < 1$.

It should be noted that, because content such as information exchange between the modules/units in the foregoing apparatus and execution processes is based on a same conception as the method embodiments of the present invention, and brings same technical effects as the method embodiments of the present invention, reference may be made to the description in the method embodiments of the present invention for details, which are not repeatedly described here.

Persons of ordinary skill in the art may understand that all or part of the steps in various methods in the foregoing embodiments may be accomplished by a program instructing relevant hardware, for example, one or multiple or all of the following methods:

performing processing on received signals $r_i(t)$ and pilot sequences $p_i(t)$ to obtain upsampling signals $y(\tau)$;

subtracting contribution values of a current multipath waveform to other multipath waveforms by using a raised cosine function with a peak position set to zero and according to a global maximum value of $|y(\tau)|^2$ and a total of M sampling points $\hat{\tau}_1^{(m)}$ near the global maximum value, to obtain an upsampling signal $y_L(\tau)$ having a minimum residual in M groups of upsampling signals $y_L^{(m)}(\tau)$, where M is an integer greater than or equal to 1, and $|y(\tau)|^2$ is a squared absolute value of $y(\tau)$; and obtaining a time delay power spectrum of the upsampling signal $y_L(\tau)$ having the minimum residual.

Persons of ordinary skill in the art may understand that all or part of the steps of the methods in the foregoing embodiments may be accomplished by a program instructing relevant hardware. The program may be stored in a computer readable storage medium, and the storage medium may include: a read only memory (ROM, Read Only Memory), a random access memory (RAM, Random Access Memory), a magnetic disk, an optical disk, and so on.

The multipath searching method and the multipath searcher provided by the embodiments of the present invention are introduced in detail in the foregoing. In this specification, specific examples are used for illustrating principles and implementation manners of the present invention. The foregoing description of the embodiments are merely used to help understanding of the method of the present invention and its core idea. Meanwhile, persons of ordinary skill in the art may make modifications to the specific implementation manners and application scopes according to the idea of the present invention. In conclusion, the content of the specification should not be construed as a limitation to the present invention.

What is claimed is:

1. A multipath searching method, comprising:

performing processing on received signals $r_i(t)$ and pilot sequences $p_i(t)$ to obtain upsampling signals $y(\tau)$;

subtracting contribution values of a current multipath waveform to other multipath waveforms by using a raised cosine function with a peak position set to zero and according to a global maximum value of $|y(\tau)|^2$ and a total of M sampling points $\hat{\tau}_1^{(m)}$ near the global maximum value, to obtain an upsampling signal $y_L(\tau)$ having a minimum residual in M groups of upsampling signals $y_L^{(m)}(\tau)$, wherein M is an integer greater than or equal to 1, and $|y(\tau)|^2$ is a squared absolute value of $y(\tau)$; and obtaining a time delay power spectrum of the upsampling signal $y_L(\tau)$ having the minimum residual.

2. The method according to claim 1, wherein the performing processing on received signals $r_i(t)$ and pilot sequences $p_i(t)$ to obtain upsampling signals $y(\tau)$ comprises:

performing correlation on the received signals $r_i(t)$ and the pilot sequences $p_i(t)$, to obtain $$y_i(\tau) = \sum_{t=0}^{N-1} r_i(t+\tau) p_i^*(t),$$

wherein $p_i^*(t)$ represents a complex conjugate of the pilot sequences $p_i(t)$;

performing coherent accumulation on $y_i(\tau)$ on I pilot symbols to obtain $$y_c(\tau) = \sum_{i=0}^{I-1} y_i(\tau),$$

wherein I is a positive integer; and performing upsampling and filtering on $y_c(\tau)$ to obtain $y(\tau)$.

3. The method according to claim 1, wherein the subtracting contribution values of a current multipath waveform to other multipath waveforms by using a raised cosine function with a peak position set to zero and according to a global maximum value of $|y(\tau)|^2$ and a total of M sampling points $\hat{\tau}_1^{(m)}$ near the global maximum value, to obtain an upsampling signal $y_L(\tau)$ having a minimum residual in M groups of upsampling signals $y_L^{(m)}(\tau)$ comprises:

searching $|y(\tau)|^2$ for a position $\hat{\tau}_g$ of the global maximum value of $|y(\tau)|^2$;

taking a total of M sampling points $\hat{\tau}_1^{(m)}$ at the position $\hat{\tau}_g$ and near the position $\hat{\tau}_g$, obtaining the M groups of upsampling signals $y_L^{(m)}(\tau)$ through an iteration operation, and calculating residuals of the M groups of $y_L^{(m)}(\tau)$; and comparing the M residuals to obtain the upsampling signal $y_L(\tau)$ having the minimum residual in the M groups of $y_L^{(m)}(\tau)$.

4. The method according to claim 3, wherein the taking a total of M sampling points $\hat{\tau}_1^{(m)}$ at the position $\hat{\tau}_g$ and the near position $\hat{\tau}_g$, obtaining the M groups of upsampling signals $y_L^{(m)}(\tau)$ through an iteration operation, and calculating residuals of the M groups of $y_L^{(m)}(\tau)$ comprises:

taking M sampling points in $[\hat{\tau}_g - \Delta\tau, \hat{\tau}_g + \Delta\tau]$;

performing an iteration operation on each sampling point $\hat{\tau}_1^{(m)}$ of the M sampling points according to formulas $y_l^{(m)}(\tau) = y_{l-1}^{(m)}(\tau) - y_{l-1}^{(m)}(\hat{\tau}_{l-1}^{(m)}) R(\tau - \hat{\tau}_{l-1}^{(m)})$ and $$\hat{\tau}_l^{(m)} = \arg\max_{\tau} |y_l^{(m)}(\tau)|^2,$$

to obtain the M groups of upsampling signals $y_L^{(m)}(\tau)$, wherein $R(\tau)$ represents a raised cosine wave function with a peak position set to zero, l takes a value of 2, 3, ..., L, and m takes a value of 1, 2, 3, ..., M; and calculating a residual for each group of upsampling signals $y_L^{(m)}(\tau)$ according to a formula $$e^{(m)} = \sum_{\tau, \tau \neq \hat{\tau}_l^{(m)}} |y_L^{(m)}(\tau)|^2.$$

5. The method according to claim 4, wherein the obtaining a time delay power spectrum of the upsampling signal $y_L(\tau)$ having the minimum residual comprises:

performing incoherent accumulation on $z_j(\tau) = |y_L(\tau)|^2$ on J time slots according to $$z(\tau) = \sum_{j=0}^{J-1} z_j(\tau),$$

wherein J is an integer greater than or equal to 1; and performing filtering on $z(\tau)$ according to $v_n(\tau) = \alpha v_{n-1}(\tau) + (1-\alpha) z(\tau)$ to obtain a time delay power spectrum $v_n(\tau)$, wherein $\alpha$ has a value range of $0 < \alpha < 1$.

6. A multipath searcher, comprising:

a pre-processing module, configured to perform processing on received signals $r_i(t)$ and pilot sequences $p_i(t)$ to obtain upsampling signals $y(\tau)$;

a minimum residual obtaining module, configured to subtract contribution values of a current multipath waveform to other multipath waveforms by using a raised cosine function with a peak position set to zero and according to a global maximum value of $|y(\tau)|^2$ and M sampling points $\hat{\tau}_1^{(m)}$ near the global maximum value, to obtain an upsampling signal $y_L(\tau)$ having a minimum residual in M groups of upsampling signals $y_L^{(m)}(\tau)$, wherein M is an integer greater than or equal to 1, and $|y(\tau)|^2$ is a squared absolute value of $y(\tau)$; and a time delay power spectrum obtaining module, configured to obtain a time delay power spectrum of the upsampling signal $y_L(\tau)$ having the minimum residual.

7. The multipath searcher according to claim 6, wherein the pre-processing module comprises:

a correlator, configured to perform correlation on the received signals $r_i(t)$ and the pilot sequences $p_i(t)$, to obtain $$y_i(\tau) = \sum_{t=0}^{N-1} r_i(t+\tau) p_i^*(t),$$

wherein $p_i^*(t)$ represents a complex conjugate of the pilot sequences $p_i(t)$;

a coherent accumulator, configured to perform coherent accumulation on $y_i(\tau)$ on I pilot symbols to obtain $$y_c(\tau) = \sum_{i=0}^{I-1} y_i(\tau),$$

wherein I is a positive integer; and a sampling and filtering unit, configured to perform upsampling and filtering on $y_c(\tau)$ to obtain $y(\tau)$.

8. The multipath searcher according to claim 6, wherein the minimum residual obtaining module comprises:

a maximum value searching submodule, configured to search $|y(\tau)|^2$ for a position $\hat{\tau}_g$ of the global maximum value of $|y(\tau)|^2$;

an iteration submodule, configured to take a total of M sampling points $\hat{\tau}_1^{(m)}$ at the position $\hat{\tau}_g$ and near the position $\hat{\tau}_g$, obtain the M groups of upsampling signals $y_L^{(m)}(\tau)$ through an iteration operation, and calculate residuals of the M groups of $y_L^{(m)}(\tau)$; and a comparing submodule, configured to compare the M residuals to obtain the upsampling signal $y_L(\tau)$ having the minimum residual in the M groups of $y_L^{(m)}(\tau)$.

9. The multipath searcher according to claim 8, wherein the iteration submodule comprises:

a sampling unit, configured to take M sampling points in $[\hat{\tau}_g - \Delta\tau, \hat{\tau}_g + \Delta\tau]$;

an iteration unit, configured to perform an iteration operation on each sampling point $\hat{\tau}_l^{(m)}$ of the M sampling points according to formulas $y_l^{(m)}(\tau) = y_{l-1}^{(m)}(\tau) - y_{l-1}^{(m)}(\hat{\tau}_{l-1}^{(m)}) R(\tau - \hat{\tau}_{l-1}^{(m)})$ and $$\hat{\tau}_l^{(m)} = \operatorname*{argmax}_\tau |y_l^{(m)}(\tau)|^2,$$

to obtain the M groups of upsampling signals $y_L^{(m)}(\tau)$, wherein $R(\tau)$ represents a raised cosine wave function with a peak position set to zero, l takes a value of 2, 3, ..., L, and m takes a value of 1, 2, 3, ..., M; and a residual calculating unit, configured to calculate a residual for each group of $y_L^{(m)}(\tau)$ according to a formula $$e^{(m)} = \sum_{\tau, \tau \neq \hat{\tau}_l^{(m)}} |y_L^{(m)}(\tau)|^2.$$

10. The multipath searcher according to claim 9, wherein the time delay power spectrum obtaining module comprises:

an incoherent accumulator, configured to perform incoherent accumulation on $z_j(\tau) = |y(\tau)|^2$ on J time slots according to $$z(\tau) = \sum_{j=0}^{J-1} z_j(\tau),$$

wherein J is an integer greater than or equal to 1; and a filter, configured to perform filtering on $z(\tau)$ according to $v_n(\tau) = \alpha \Xi_{n-1}(\tau) + (1-\alpha) z(\tau)$ to obtain a time delay power spectrum $v_n(\tau)$, wherein $\alpha$ has a value range of $0 < \alpha < 1$.

* * * * *